United States Patent
Hasebe et al.

(10) Patent No.: US 12,076,977 B2
(45) Date of Patent: Sep. 3, 2024

(54) IMAGE PRINTING APPARATUS, IMAGE PRINTING METHOD, AND MEDIUM STORING IMAGE PRINTING PROGRAM

(71) Applicant: BROTHER KOGYO KABUSHIKI KAISHA, Nagoya (JP)

(72) Inventors: Kenta Hasebe, Nagoya (JP); Kosuke Nukui, Nagoya (JP); Yasuhiro Taga, Kani (JP); Takashi Kanzaki, Nagoya (JP); Shuhei Suzuki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 52 days.

(21) Appl. No.: 17/553,084

(22) Filed: Dec. 16, 2021

(65) Prior Publication Data
US 2022/0194104 A1    Jun. 23, 2022

(30) Foreign Application Priority Data
Dec. 23, 2020  (JP) .................... 2020-214148

(51) Int. Cl.
*B41J 11/00* (2006.01)
*B41J 2/135* (2006.01)
*C09D 11/101* (2014.01)

(52) U.S. Cl.
CPC ......... *B41J 11/00214* (2021.01); *B41J 2/135* (2013.01); *C09D 11/101* (2013.01)

(58) Field of Classification Search
CPC .... B41J 11/00214; B41J 11/0021; B41J 2/01; B41J 2/165; B41J 2/16505; B41J 25/001;
(Continued)

(56) References Cited

U.S. PATENT DOCUMENTS 4,814,795 A * 3/1989 Kuester .............. B41J 2/01
  347/4
7,008,482 B2 * 3/2006 Goto ............... B41J 2/16579
  118/313
(Continued)

FOREIGN PATENT DOCUMENTS

JP  2004-174900 A  6/2004
JP  2004-202955 A  7/2004
(Continued)

OTHER PUBLICATIONS

Japanese Office Action for the related Japanese Patent Application No. 2020-214148 dated Jul. 16, 2024.

*Primary Examiner* — John Zimmermann
(74) *Attorney, Agent, or Firm* — KENEALY VAIDYA LLP (57) ABSTRACT

An image recording apparatus includes: a jetting head which is movable in a main scanning direction and which has nozzles configured to jet an ultraviolet-curable type ink onto a printing medium; a light source which is configured to irradiate the ultraviolet-curable type ink jetted onto the printing medium with an ultraviolet ray; a movement mechanism which is configured to relatively move the printing medium with respect to the jetting head in a subsidiary scanning direction orthogonal to the main scanning direction; and a controller. The controller is configured to cause the ink contained in the jetting head to be agitated without jetting the ink at least during irradiation with the ultraviolet ray by the light source.

12 Claims, 9 Drawing Sheets

(58) Field of Classification Search
CPC .. B41J 25/308; B41J 11/00; B41J 3/28; B05B 13/04
See application file for complete search history.

(56) References Cited

U.S. PATENT DOCUMENTS

| | | | |
|---|---|---|---|
| 8,147,031 B2 * | 4/2012 | Shinoda | B41J 2/16585 347/29 |
| 2004/0227783 A1 * | 11/2004 | Kumamoto | B41J 11/0021 347/22 |
| 2005/0012778 A1 | 1/2005 | Nishino et al. | |
| 2005/0169808 A1 * | 8/2005 | Pinkel | B41J 2/005 422/504 |
| 2006/0075917 A1 | 4/2006 | Edwards | |
| 2011/0012957 A1 * | 1/2011 | Kersey | B41J 17/24 347/33 |
| 2021/0291565 A1 * | 9/2021 | Noda | B41J 11/00214 |

FOREIGN PATENT DOCUMENTS

| | | |
|---|---|---|
| JP | 2004-216809 A | 8/2004 |
| JP | 2005-047261 A | 2/2005 |
| JP | 2005-212412 A | 8/2005 |
| JP | 2006-123452 A | 5/2006 |

* cited by examiner

FIG. 8

IMAGE PRINTING APPARATUS, IMAGE PRINTING METHOD, AND MEDIUM STORING IMAGE PRINTING PROGRAM

CROSS REFERENCE TO RELATED APPLICATIONS

The present application claims priority from Japanese Patent Application No. 2020-214148, filed on Dec. 23, 2020, the disclosure of which is incorporated herein by reference in its entirely.

BACKGROUND

The present teaching relates to an image recording apparatus including, for example, an ink-jet printer, an image recording method based on the use of the image recording apparatus, and an image recording program to be executed by a computer of the image recording apparatus.

Conventionally, as for an inkjet printer which uses an ultraviolet-curable type ink, such a task is known that the ultraviolet-curable type ink adhered to nozzles is consequently cured by the scattered light coming from an ultraviolet light source and the reflected light coming from a printing medium. As an exemplary countermeasure thereagainst, it is known that an added-up value, which is obtained by adding up measured values of the ultraviolet light amount, is compared with a threshold value, and a maintenance operation is performed for the jetting head if the added-up value exceeds the threshold value. The maintenance as described above is exemplified, for example, by flushing of the ink.

SUMMARY

When the flushing is performed, it is necessary that the jetting head should be moved to the maintenance position which is the position to perform the flushing. However, the following task arises. That is, if the nozzles are irradiated with the reflected light of the ultraviolet ray during the movement of the jetting head, the curing of the ink advances in the nozzles. Further, if the time, which is required to move the jetting head to the maintenance position, is long, the curing of the ink easily advances in the nozzles. As a result, even when the flushing is performed for the nozzles, it is difficult to remove the cured ink.

In view of the above, an object of the present teaching is to provide an image recording apparatus, an image recording method, and a medium recorded with an image recording program which make it possible to suppress the ultraviolet-curable type ink contained in the nozzles from being cured during the irradiation or after the irradiation of the ultraviolet ray.

According to an aspect of the present teaching, there is provided an image recording apparatus including:

a jetting head being movable in a main scanning direction and including nozzles configured to jet an ultraviolet-curable type ink onto a printing medium;

a light source configured to irradiate the ultraviolet-curable type ink jetted onto the printing medium with an ultraviolet ray;

a movement mechanism configured to relatively move the printing medium with respect to the jetting head in a subsidiary scanning direction orthogonal to the main scanning direction and a controller configured to cause the ink contained in the jetting head to be agitated without jetting the ink, at least during irradiation with the ultraviolet ray by the light source.

According to the present teaching, the agitating process, in which the ultraviolet-curable type ink contained in the jetting head is agitated without discharging the ink, is executed at least during the irradiation of the ultraviolet ray by the light source. Accordingly, even if the scattered light coming from the ultraviolet light source and the reflected light coming from the printing medium are irradiated onto the ultraviolet-curable type ink contained in the nozzles, the ink contained in the nozzles can be suppressed from being cured during the irradiation or after the irradiation of the ultraviolet ray by means of the agitating process.

According to the present teaching, it is possible to provide the image recording apparatus, the image recording method, and the image recording program which make it possible to suppress the ultraviolet-curable type ink contained in the nozzles from being cured during the irradiation or after the irradiation of the ultraviolet ray.

DETAILED DESCRIPTION

An image recording apparatus according to an embodiment of the present teaching will be explained below with reference to the drawings. The image recording apparatus explained below is merely an embodiment of the present teaching. Therefore, the present teaching is not limited to the following embodiment. It is possible to make addition, deletion, and change within a range without deviating from the gist or essential characteristics of the present teaching.

Figure 1:
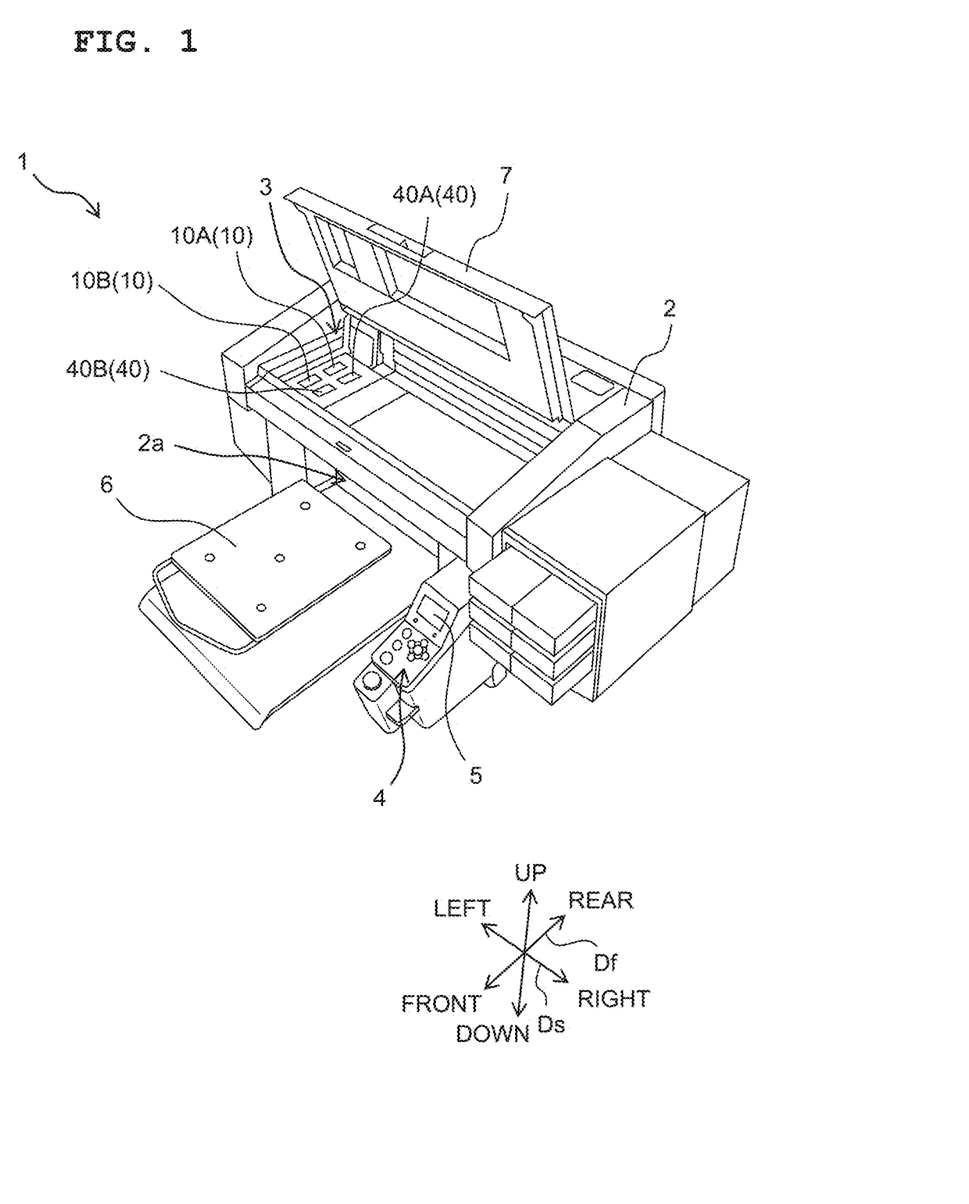
FIG. 1 is a perspective view illustrative of an image recording apparatus according to an embodiment of the present teaching.

The image recording apparatus 1 will be explained with reference to FIG. 1. In FIG. 1, the directions, which are orthogonal to one another, are defined as "up-down direction", "left-right direction", and "front-rear direction". Note that the left-right direction is the main scanning direction Ds described later on, and the front-rear direction is the subsidiary scanning direction Df described later on. The image recording apparatus 1 can be utilized not only for the printing on the printing medium W such as the printing paper or the like but also for the goods printing to effect the printing on the printing medium W such as the resin or the like including, for example, various goods.

Figure 5:
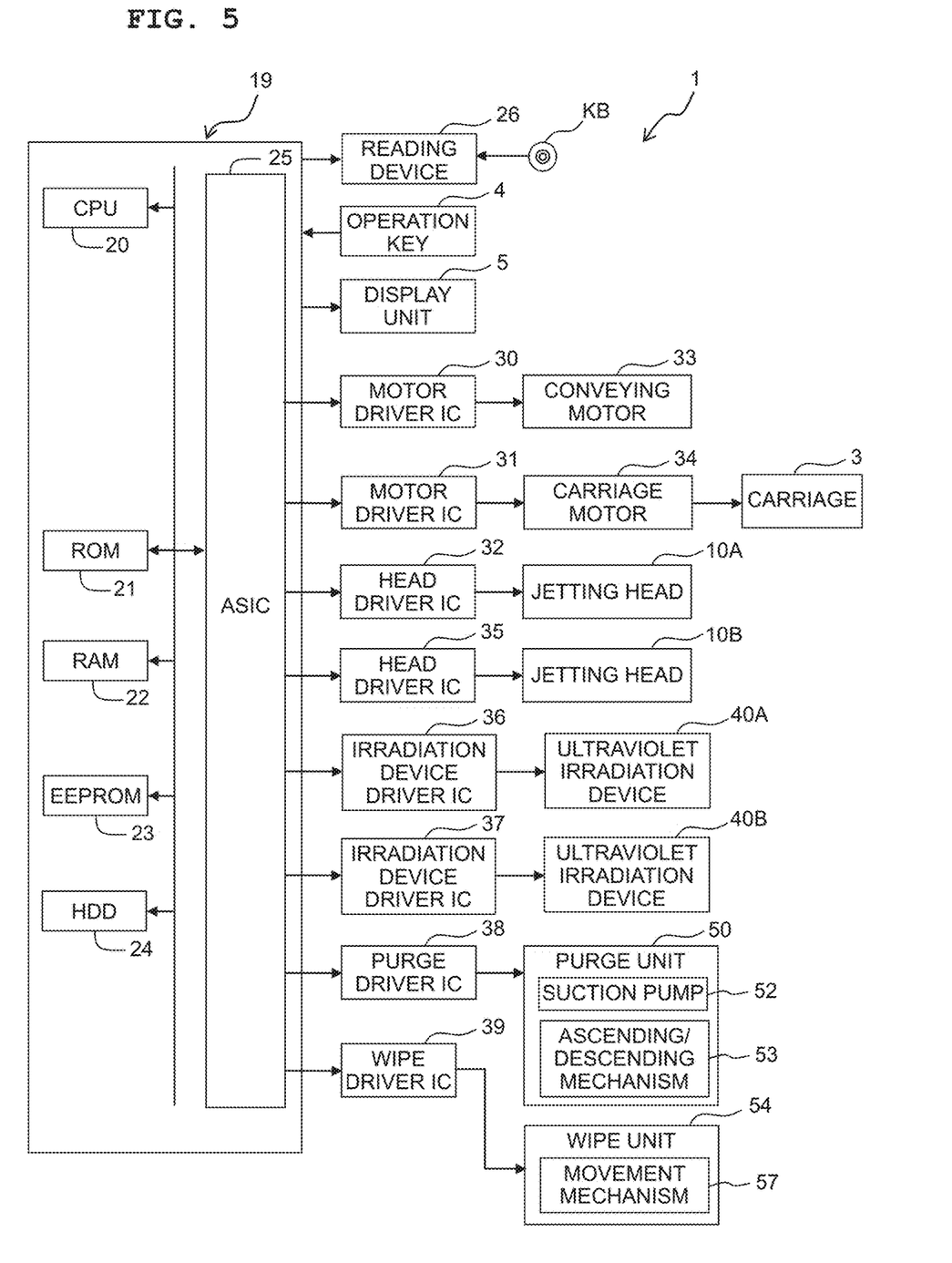
FIG. 5 is a block diagram illustrative of constrictive components of the image recording apparatus depicted in FIG. 1.

As depicted in FIG. 1, the image recording apparatus 1 of this embodiment is provided with a casing 2, an operation key 4, a display unit 5, a platen 6 on which the medium subjected to the discharge is arranged, and an upper cover 7. Further, the image recording apparatus 1 is provided with an ink jetting device 1a (FIG. 2) described later on and a controller 19 (FIG. 5).

The casing 2 is formed to have a box-shaped configuration. The casing 2 has an opening 2a on the front surface, and the casing 2 has an unillustrated opening on the rear surface. The operation key 4 is provided at a front position on the right side of the casing 2. Further, the display unit 5 is provided at a position at the rear of the operation key 4. The operation key 4 accepts the operation input performed by a user. The display unit 5 is configured, for example, by a touch panel, and the display unit 5 displays predetermined information. A part of the display unit 5 also functions as an operation key at a predetermined timing. The controller 19 realizes the printing function on the basis of the input from the operation key 4 or the external input via an unillustrated communication interface, and the controller 19 controls the display on the display unit 5.

The platen 6 corresponds to the movement mechanism, and the platen 6 is configured so that the printing medium W can be placed. The platen 6 has a predetermined thickness, and the platen 6 is configured, for example, by a rectangular plate member in which the subsidiary scanning direction Df is the longitudinal direction. The platen 6 is detachably supported by an unillustrated platen support stand. The platen support stand is configured to be movable in the subsidiary scanning direction Df between the printing position at which the printing is executed on the printing medium W in accordance with the driving of a conveying motor 33 (FIG. 5) and an attachment/detachment position at which the printing medium W is detached from the platen 6. Accordingly, the platen 6 relatively moves the printing medium W in the subsidiary scanning direction Df with respect to the jetting head 10. The printing position is the position at which the platen 6 is opposed to the jetting head 10 as described later on. The attachment/detachment position is the position at which the platen support stand is arranged at the outside of the casing 2, and the attachment/detachment position is the position at which the printing medium W can be placed on the platen 6. During the printing, the platen 6 is moved in the subsidiary scanning direction Df. Therefore, the printing medium W, which is placed on the platen 6, is conveyed in the subsidiary scanning direction Df.

The upper cover 7 is configured so that the upper cover 7 is rotated upwardly when the front portion thereof is lifted. Accordingly, the interior of the casing 2 is exposed.

Figure 2:
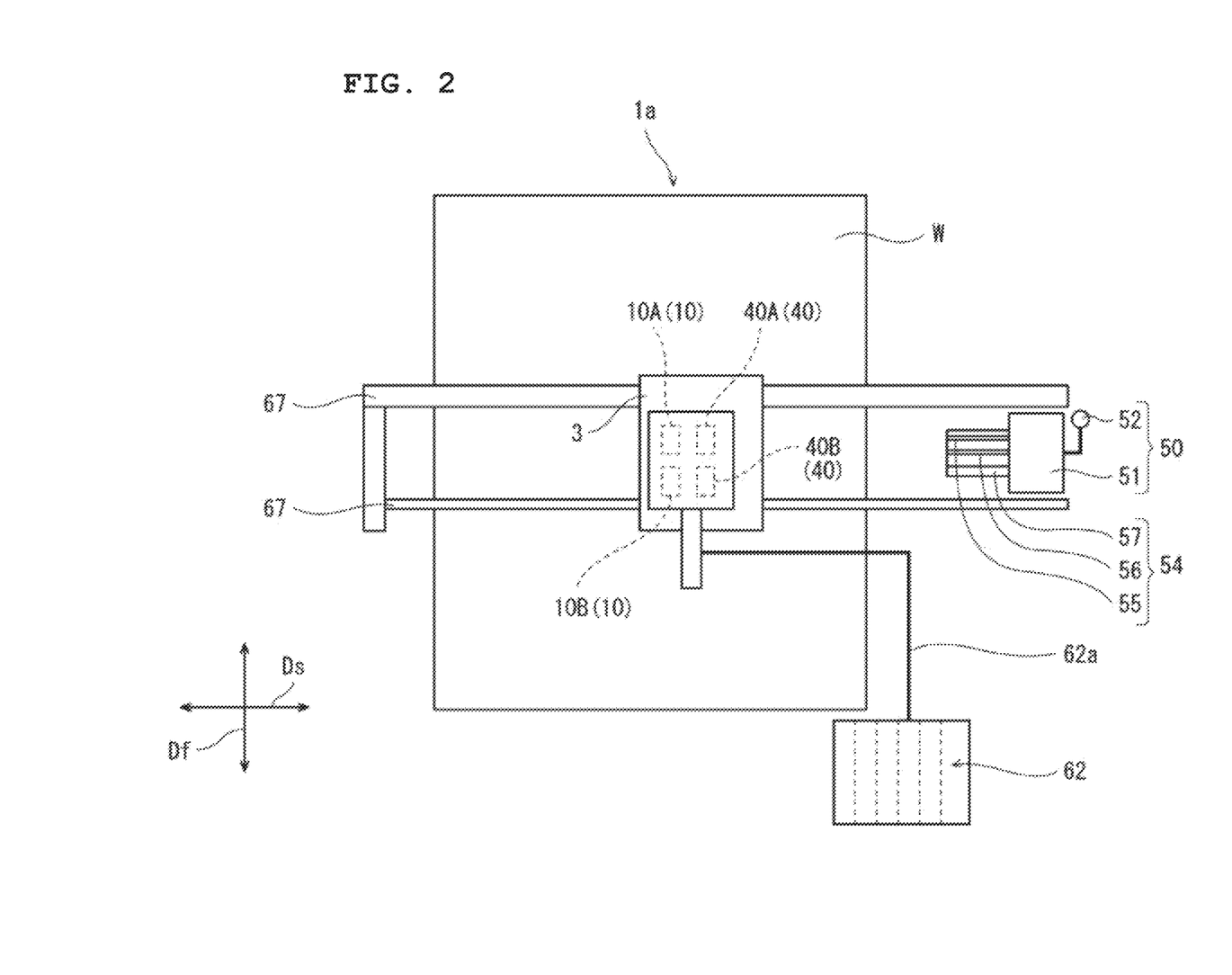
FIG. 2 is a plan view illustrative of an ink jetting device provided for the image recording apparatus depicted in FIG. 1.

As depicted in FIG. 2, the ink jetting device 1a is provided with storage tanks 62, a carriage 3 on which two jetting heads 10 (10A, 10B) and two ultraviolet irradiation devices 40 (40A, 40B) are carried, and a pair of guide rails 67. An ink-jet head, which jets, for example, an ultraviolet-curable type ink, can be used as the jetting head 10.

The carriage 3 is supported by the pair of guide rails 67 extending in the main scanning direction Ds. The carriage 3 is reciprocatively movable in the main scanning direction Ds along the guide rails 67. Accordingly, the two jetting heads 10 (10A, 10B) and the two ultraviolet irradiation devices 40 (40A, 40B) are reciprocatively movable in the main scanning direction Ds. The jetting head 10 is connected to the storage tanks 62 via tubes 62a.

In this embodiment, for example, the jetting head 10A jets inks of respective colors of yellow (Y), magenta (M), cyan (C), and black (K) which are generally referred to as "color inks". A color image is printed on the printing medium W by jetting the four color inks described above onto the printing medium W. On the other hand, the jetting head 10B jets an ink of white (W) and an ink of clear (Cr). For example, when a color image is printed on cloth or fabric as the printing medium W, then the white ink is previously jetted as an undercoat ink in order to reduce the influence on the color of the cloth or fabric or the material of the cloth or fabric, and the color inks are jetted onto the white ink. Further, the clear ink is jetted when the gloss is applied or when the printed portion is protected.

The inks are stored in the storage tanks 62. The storage tanks 62 are provided for the respective types of the inks. For example, six storage tanks 62 are provided, in which the black, yellow, cyan, magenta, white, and clear inks are stored respectively.

In this case, as depicted in FIG. 2, the ink jetting device 1a is further provided with a purge unit 50 and a wipe unit 54. The purge unit 50 and the wipe unit 54 are arranged on one end side in the main scanning direction Ds of the pair of guide rails 67 so that the purge unit 50 and the wipe unit 54 are overlapped with the movement area of the carriage 3.

The purge unit 50 has a cap 51, a suction pump 52, and an ascending/descending mechanism 53. The suction pump 52 is connected to the cap 51. The ascending/descending mechanism 53 moves the cap 51 upwardly/downwardly between the suction position and the waiting position. At the waiting position, the jetting surface NM (FIG. 3) is separated from the cap 51. On the other hand, at the suction position, the jetting surface NM is covered with the cap 51, and the hermetically closed space is formed. When the cap 51 is disposed at the suction position, if the suction pump 52 is driven, then the hermetically closed space is subjected to the suction, and the inks are discharged from nozzle holes 121a (FIG. 3) described later on. In this way, the purge process is executed to forcibly discharge the inks from the nozzles 121. Note that the purge process may be performed after the agitating process described later on.

The wipe unit 54 has two wipers 55, 56 and a movement mechanism 57. The two wipers 55, 56 are supported by the movement mechanism 57. The movement mechanism 57 is moved in the subsidiary scanning direction Df in a state in which the jelling surfaces NM are arranged at the positions opposed to the wipers 55, 56. Accordingly, the two wipers 55, 56 perform the wiping action (i.e., the wiping of the jetting surfaces NM) while being moved in the subsidiary scanning direction Df.

Figure 3:
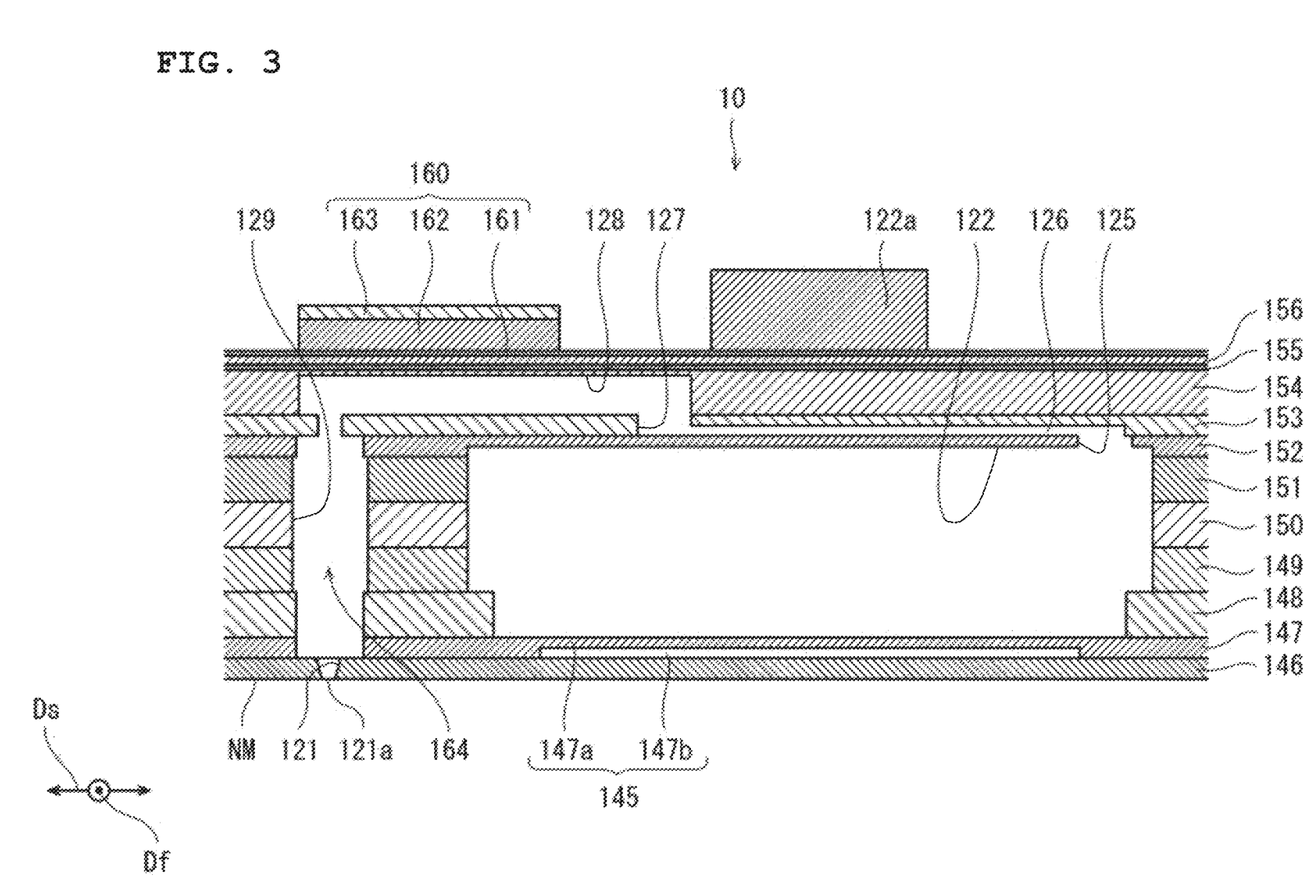
FIG. 3 is a sectional view illustrative of the configuration of a jetting head.

In the next place, as depicted in FIG. 3, the jetting head 10 has a plurality of nozzles 121 for jetting liquid droplets by using the inks supplied from the storage tanks 62. The jetting head 10 has a stack of a flow passage forming member and a volume changing unit. The flow passage firming member has ink flow passages formed at the inside thereof. A plurality of nozzle holes 121a are open on the jetting surface NM as the lower surface of the flow passage forming member. Further, the volume changing unit described above changes the volume of the ink flow passage by being driven. In this situation, the meniscus is vibrated in the nozzle hole 121a, and the ink is jetted. The configuration of the discharged 10 will be explained in detail below.

The foregoing flow passage forming member of the jetting head 10 is a stack of a plurality of plates. The volume changing unit includes a vibration plate 155 and an actuator (piezoelectric element) 160. An insulating film 156 is stacked on the vibration plate 155. A common electrode 161 described later on is stacked on the insulating film 156.

The plurality of plates are stacked while including a nozzle plate 146, a spacer plate 147, a first flow passage plate 148, a second flow passage plate 149, a third flow passage plate 150, a fourth flow passage plate 151, a fifth flow passage plate 152, a sixth flow passage plate 153, and a seventh flow passage plate 154 as referred to in this order from the bottom.

A variety of large and small holes and grooves are formed for the respective plates. The holes and the grooves are combined with each other at the inside of the flow passage forming member obtained by stacking the respective plates. Thus, the plurality of nozzles 121, a plurality of individual flow passages 164, and manifolds 122 are formed as ink flow passages.

The nozzle 121 is formed by penetrating through the nozzle plate 146 in the stacking direction. The plurality of nozzle holes 121a, which are the forward ends of the nozzles 121, are aligned in the subsidiary scanning direction to form nozzle arrays on the jetting surface NM of the nozzle plate 146.

The manifold 122 supplies the ink to a pressure chamber 128 to which the ink jetting pressure is applied. The manifold 122 extends in the subsidiary scanning direction Df. The manifold 122 is connected to one end of each of the plurality of individual flow passages 164. That is, the manifold 122 functions as a common flow passage for the ink. The manifold 122 is formed by overlapping, in the stacking direction, the through-holes which penetrate in the stacking direction through the first flow passage plate 148 to the fourth flow passage plate 151 and a recess which is recessed from the lower surface of the fifth flow passage plate 152.

The nozzle plate 146 is arranged under the spacer plate 147. The spacer plate 147 is formed, for example, of a stainless steel material. The spacer plate 147 is recessed in the thickness direction of the spacer plate 147 from the surface disposed on the side of the nozzle plate 146, for example, by means of the half etching. Thus, the spacer plate 147 has a thin-walled portion which forms a damper portion 147a and a recess 145 with which a damper space 147b is formed. Owing to the configuration as described above, the damper space 147b, which serves as a buffer space, is formed between the manifold 122 and the nozzle plate 146.

A supply port 122a is communicated with the manifold 122. The supply port 122a is formed, for example, to have a cylindrical shape, and the supply port 122a is provided at one end in the subsidiary scanning direction Df. Note that the manifold 122 and the supply port 122a are connected to one another by an unillustrated flow passage.

The plurality of individual flow passages 164 are connected to the manifold 122 respectively. An upstream end of the individual flow passage 164 is connected to the manifold 122, and a downstream end thereof is connected to the proximal end of the nozzle 121. Each of the individual flow passages 164 is configured by a first communication hole 125, a supply throttle passage 126 as an individual throttle passage, a second communication hole 127, the pressure chamber 128, and a descender 129. These constitutive components are arranged in this order.

The first communication hole 125 has its lower end which is connected to the upper end of the manifold 122. The first communication hole 125 extends upwardly in the stacking direction from the manifold 122, and the first communication hole 125 penetrates in the stacking direction through the upper portion of the fifth flow passage plate 152.

The upstream end of the supply throttle passage 126 is connected to the upper end of the first communication hole 125. The supply throttle passage 126 is formed, for example, by the half etching. The supply throttle passage 126 is configured by a groove which is recessed from the lower surface of the sixth flow passage plate 153. The second communication hole 127 has its upstream end which is connected to the downstream end of the supply throttle passage 126. The second communication hole 127 extends upwardly in the stacking direction from the supply throttle passage 126. The second communication hole 127 is formed by penetrating through the sixth flow passage plate 153 in the stacking direction.

The pressure chamber 128 has its upstream end which is connected to the downstream end of the second communication hole 127. The pressure chamber 128 is formed by penetrating through the seventh flow passage plate 154 in the stacking direction.

The descender 129 is formed by penetrating through the spacer plate 147, the first flow passage plate 148, the second flow passage plate 149, the third flow passage plate 150, the fourth flow passage plate 151, the fifth flow passage plate 152, and the sixth flow passage plate 153 in the stacking direction. The descender 129 has its upstream end which is connected to the downstream end of the pressure chamber 128 and its downstream end which is connected to the proximal end of the nozzle 121. The nozzle 121 is overlapped with the descender 129, for example, in the stacking direction. The nozzle 121 is arranged at the center of the descender 129 in the widthwise direction.

The vibration plate 155 is stacked on the seventh flow passage plate 154. The vibration plate 155 covers the upper end opening of the pressure chamber 128.

The actuator 160 includes the common electrode 161, a piezoelectric layer 162, and an individual electrode 163, and these components are arranged in this order. The common electrode 161 covers the entire surface of the vibration plate 155 with the insulating film 156 intervening therebetween. The piezoelectric layer 162 is provided for each of the pressure chambers 128. The piezoelectric layer 162 is arranged on the common electrode 161 so that the piezoelectric layer 162 is overlapped with the pressure chamber 128. The individual electrode 163 is provided for each of the pressure chambers 128. The individual electrode 163 is arranged on the piezoelectric layer 162. One actuator 160 is configured by one individual electrode 163, the common electrode 161, and the piezoelectric layer 162 disposed at the portion interposed by the both electrodes.

The individual electrode 163 is electrically connected to the driver IC. The driver IC receives a control signal from an unillustrated control unit to generate a driving signal (voltage signal) which is applied to the individual electrode 163. On the other hand, the common electrode 161 is always retained at the ground electric potential. In the configuration as described above, the active portion of the piezoelectric layer 162 is expanded/shrunk in the in-plane direction together with the two electrodes 161, 163 in accordance with the driving signal. In accordance therewith, the vibration plate 155 is deformed to cause the change in the direction to increase/decrease the volume of the pressure chamber 128, Accordingly, the jetting pressure, which allows the ink to be jetted from the nozzle 121, is applied to the pressure chamber 128.

In the jetting head 10 as described above, when the ink flows into the manifold 122 via the supply port 122a, the ink flows into the supply throttle passage 126 from the manifold 122 via the first communication hole 125. The ink flows into the pressure chamber 128 from the supply throttle passage 126 via the second communication hole 127. After that, the ink flows through the descender 129, and the ink flows into the nozzle 121. In this situation, when the jetting pressure is applied to the pressure chamber 128 by the actuator 160, the ink is jetted from the nozzle hole 121a.

Figure 4:
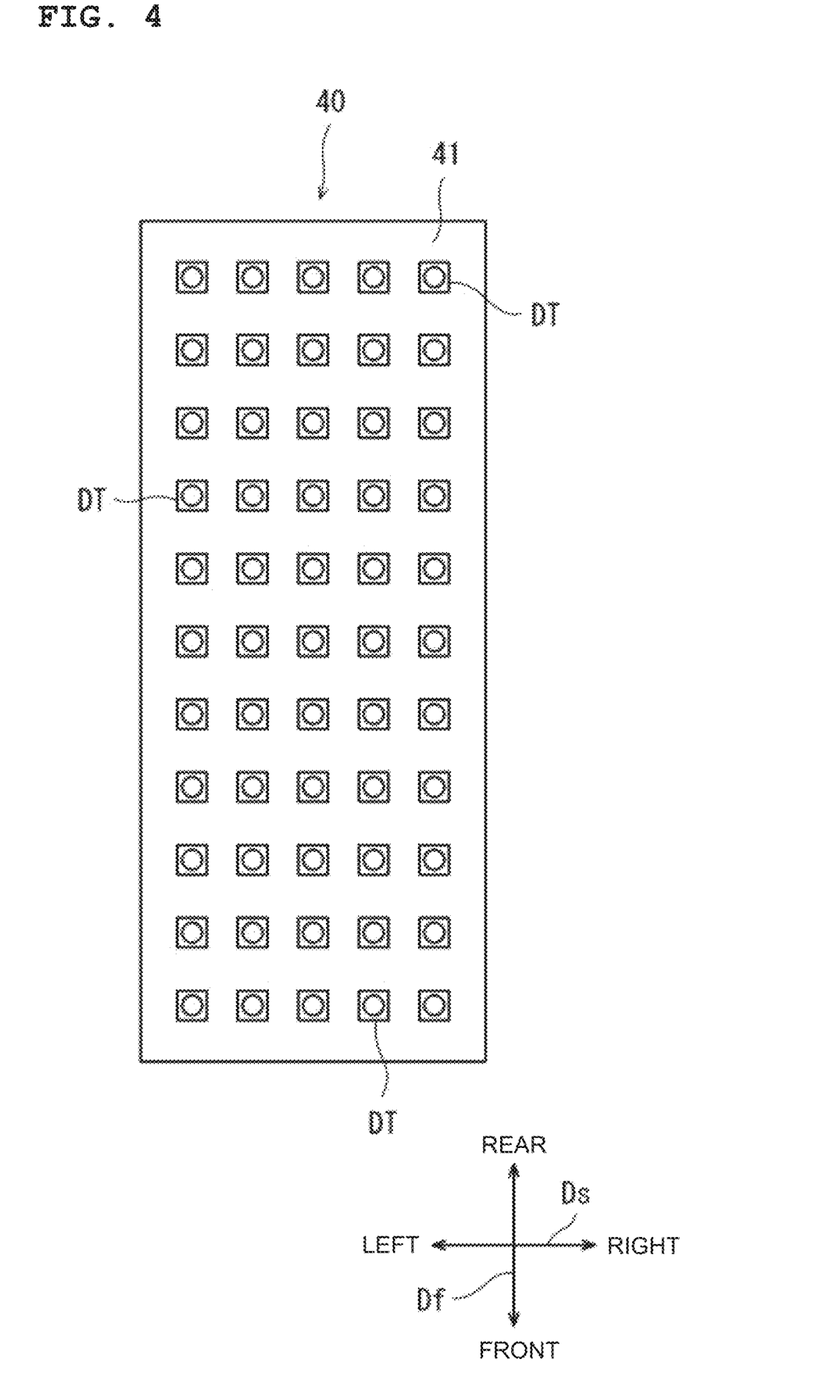
FIG. 4 is a view illustrative of light emitting diode chips of an ultraviolet irradiation device.

In the next place, the ultraviolet irradiation device 40 will be explained with reference to FIG. 4. As depicted in FIG. 4, the ultraviolet irradiation device 40 has a support substrate 41 and a plurality of light emitting, diode chips DI which are arranged on the support substrate 41 and which emit the ultraviolet ray. The ultraviolet irradiation device 40 or the light emitting diode chip DT corresponds to the light source which irradiates the ultraviolet ray in order to cure the ink jetted by the jetting head 10. The light emitting diode chip DT is a semiconductor element for generating the ultraviolet ray. The respective light emitting diode chips DT are regularly arranged, for example, at predetermined intervals in the main scanning direction Ds and the subsidiary scanning direction Df respectively. The light emitting diode chips DT are arranged, for example, in a matrix form.

Next, an explanation will be made with reference to a block diagram about respective constitutive components of the image recording apparatus 1 of this embodiment. As depicted in FIG. 5, the image recording apparatus 1 of this embodiment is provided with the controller 19, a reading device 26, motor driver ICs 30, 31, head driver ICs 32, 35, a conveying motor 33, a carriage motor 34, irradiation device driver ICs 36, 37, a purge driver IC 38, and a wipe driver IC 39, in addition to the constitutive components described above.

The controller 19 has CPU 20, a storage unit (ROM 21, RAM 22, EEPROM 23, HDD 24), and ASIC 25. CPU is a control unit of the image recording apparatus 1. CPU 20 is connected to the storage unit described above, and CPU 20 controls the respective driver ICs 30 to 32, 35 to 39, and the display unit 5.

CPU 20 executes various functions by executing the image recording program of this embodiment stored in ROM 21. CPU 20 max be mounted as one processor in the controller 19, or CPU 20 may be mounted as a plurality of processors which cooperate with each other. The image recording program is read by the reading device 26 from a recording medium KB such as a magneto-optical disk or the like or a USB flash memory or the like capable of being read by a computer, and the program is stored in ROM 21. The threshold value of the distance h between the platen 6 and the jetting surface NM of the nozzle 121 is stored in ROM 21. The calculation result of CPU 20 is stored in RAM 22. Various initial setting information inputted by the user is stored in EEPROM 23. For example, specified information is stored in HDI) 24.

The motor driver ICs 30, 31, the head driver ICs 32, 35, the irradiation device driver ICs 36, 37, the purge driver IC 38, and the wipe driver 39 are connected to ASIC 25. If CPU 20 accepts the printing job from the user, CPU 20 outputs an image recording command to ASIC 25 on the basis of the image recording program. ASIC 25 drives the respective driver ICs 30 to 32, 35 to 39 on the basis of the image recording command. CPU 20 drives the conveying motor 33 by the aid of the motor driver IC 30, and thus CPU 20 moves the platen 6 in the subsidiary scanning direction Df. CPU 20 drives the carriage motor 34 by the aid of the motor driver IC 31, and thus CPU 20 moves the carriage 3 in the main scanning direction Ds. CPU 20 allows the inks to be jetted from the jetting heads 10A, 103 by the aid of the head driver ICs 32, 35. CPU 20 allows the ultraviolet ray to be irradiated from the respective light emitting diode chips DT of the ultraviolet irradiation devices 40A, 40B by the aid of the irradiation device driver ICs 36, 37, CPU 20 drives the suction pump 52 and the ascending/descending mechanism 53 of the purge unit 50 by the aid of the purge driver IC 38. CPU 20 drives the movement mechanism 57 of the wipe unit 54 by the aid of the wipe driver IC 39.

Figure 6A:
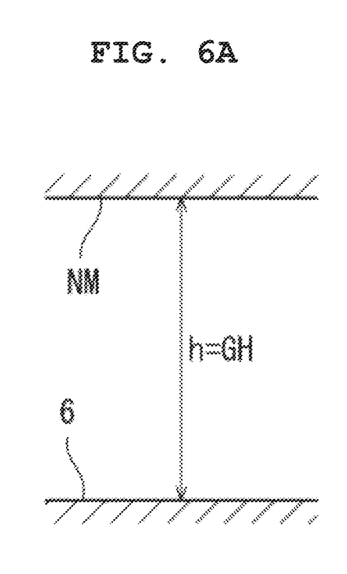
FIG. 6A is a view to show that the distance between a platen and a nozzle is the high gap.
Figure 6B:
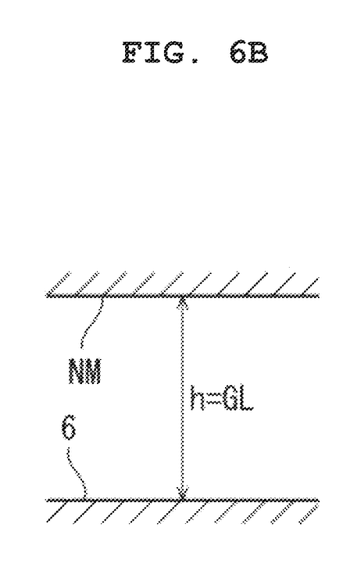
FIG. 6B is a view to show that the distance is the low gap.

Next, an explanation will be made with reference to FIG. 6 about the distance h between the platen 6 and the jetting surface NM of the nozzle 121. As depicted in FIG. 6A, the distance, which is provided when the distance h between the platen 6 and the jetting surface NM is the largest in this embodiment, is the high gap GH. Further, as depicted in FIG. 6B, the distance, which is provided when the distance h between the platen 6 and the jetting surface NM is the smallest, is the low gap GL. The high gap GH is, for example, 18 mm. The low gap GL is, for example, 2 mm. The printing mode, in which the distance h is the high gap GH, is referred to as "high gap printing mode". The printing mode, in which the distance h is the low gap GL, is referred to as "low gap printing mode". The printing job includes the information to instruct the high gap printing mode in which the printing is performed with the high gap GH and the low gap printing mode in which the printing is performed with the low gap GL.

In this situation relevant to this embodiment, the controller 19 executes the agitating process (referred to as "non-jetting flushing") for causing the ink contained in the jetting head 10 to be agitated without jetting the ink at least during the irradiation with the ultraviolet ray effected by the light emitting diode chips DT. In particular, the controller 19 gives, to the actuator 160, the driving signal different from the signal given during the ink jetting at least during the irradiation with the ultraviolet ray, and thus the controller 19 agitates the ink contained in the nozzle 21, the ink contained in the pressure chamber 128, and the ink contained in the descender 129 respectively. In this case, the driving signal is such a signal that the liquid droplets are not jetted even in the case of such a state that the meniscus of the ink is convex in the downward direction. The non-jetting flushing of this embodiment will be explained in detail below.

Next, an explanation will be made with reference to FIG. 7 about the jetting states depending on the illuminance of the reflected light coming to the nozzles 121 as provided when the non-jetting flushing is present and when the non-jetting flushing is absent. Note that the reflected light is the light provided such that the light, which is emitted from the light emitting diode chips DT, is reflected by at least any one of the light emitting diode chips DT, the platen 6, and the printing medium W.

Figure 7:
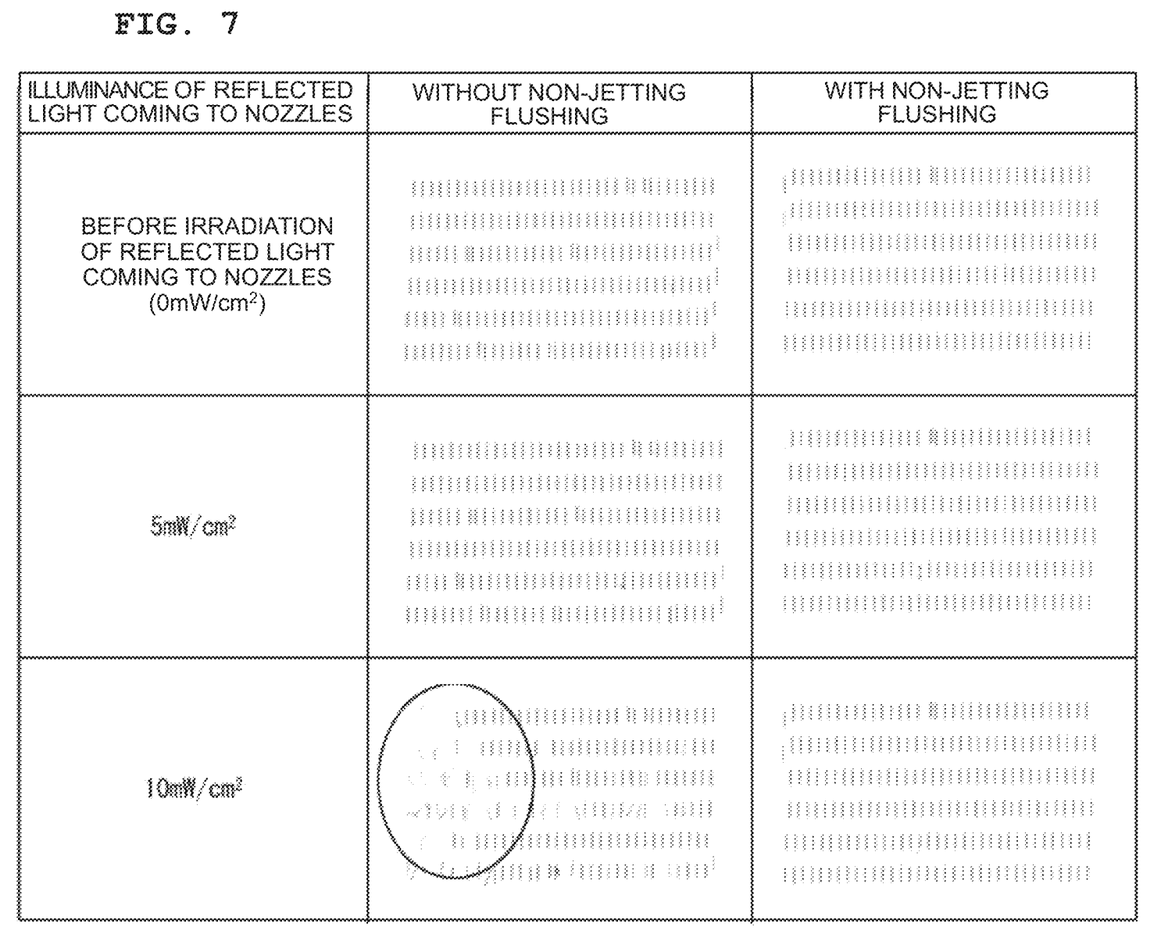
FIG. 7 is a view to explain the jetting state of an ink when the non-jetting flushing is not executed.

As depicted in FIG. 7, if the illuminance of the reflected light coming to the nozzles 121 is 0 mW/cm$^2$ and 5 mW/cm$^2$, the jetting state is satisfactory irrelevant to the presence or absence of the non-jetting flushing. In other words, it is understood that any nozzle 121, which undergoes the jetting failure, is absent if the illuminance of the reflected light is not more than 5 mW/cm$^2$. On the contrary, if the illuminance of the reflected light coming to the nozzles 121 is 10 mW/cm$^2$, then the satisfactory jetting state can be secured if the non-jetting flushing is executed, but a portion (portion surrounded by a circle in FIG. 7), in which the satisfactory jetting state is not provided, is present (i.e., the nozzles 121, which undergo the jetting failure, are present) if the non jetting flushing is not executed. According to the fact as described above, the threshold value of the illuminance of the reflected light is 5 mW/cm².

Figure 8:
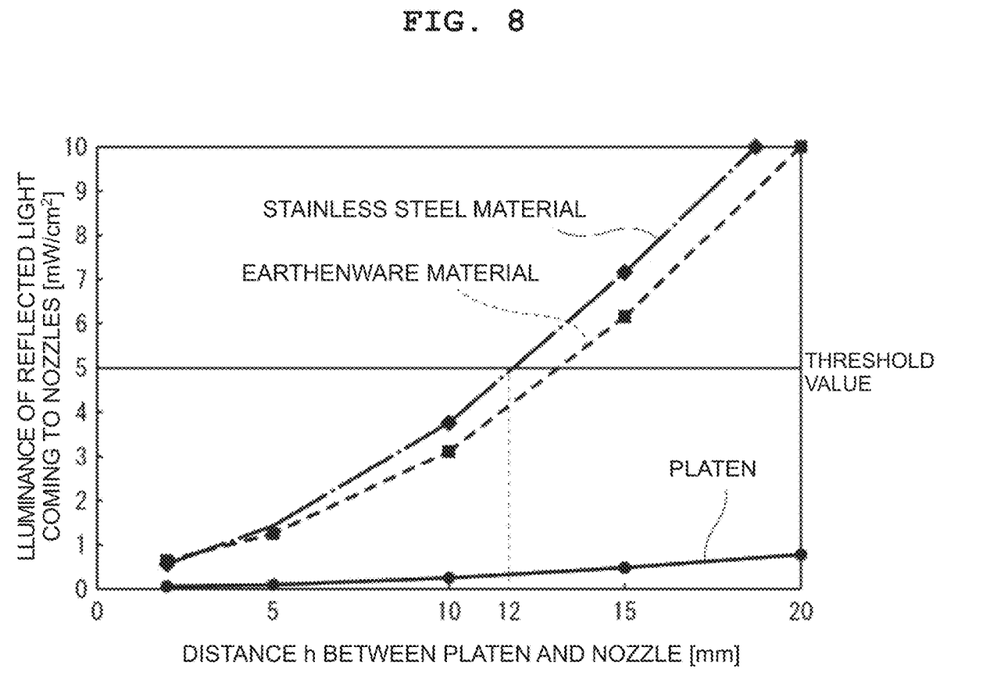
FIG. 8 is a graph concerning simulation results to show the relationship between the distance between the platen and the nozzle and the illuminance of the reflected light coming to the nozzle.

In the next place, an explanation will be made with reference to FIG. 8 about simulation results to show the relationship between the distance h between the platen 6 and the jetting surface NM of the nozzle 121 and the illuminance of the reflected light coming to the nozzle 121. FIG. 8 depicts the relationship between the illuminance of the reflected light (hereinafter referred to as "platen reflected light") coming from the platen 6 to the nozzle 121 and the distance h, the relationship between the illuminance of the reflected light (hereinafter referred to as "earthenware material reflected light") coming from the printing medium W composed of an earthenware material to the nozzle 121 and the distance h, and the relationship between the illuminance of the reflected light (hereinafter referred to as "stainless steel material reflected light") coming from the printing medium W composed of a stainless steel material to the nozzle 121 and the distance h.

With reference to FIG. 8, it is assumed that the threshold value of the illuminance of the reflected light is 5 mW/cm² as described above. On this assumption, the reflected light, which is selected from the platen reflected light, the earthenware material reflected light, and the stainless steel material reflected light and which allows the illuminance to arrive at the threshold value with the minimum numerical value (12 mm) of the distance h, is the stainless steel material reflected light. According to the fact as described above, it is estimated that the nozzles 121, which undergo the jetting failure, are present if the stainless steel material is used as the printing medium W and if the distance h is not less than 12 mm. In view of the viewpoint as described above, the controller 19 executes the non-jetting flushing as the agitating process if the distance h is larger than the previously stored threshold value (10 mm in this embodiment) during the irradiation with the ultraviolet ray. Note that the threshold value is stored in ROM 21.

Alternatively, the following procedure is also available in place of or in combination of the judgment to judge whether the execution of the non-jetting flushing based on the use of the threshold value is present or absent as described above. That is, the controller 19 executes the non-jetting flushing as the agitating process if the printing mode is the high gap printing mode, the printing mode including the low gap printing mode and the high gap printing mode. The reason, why the non-jetting flushing is executed when the printing mode is the high gap printing mode, is that the spread of the outgoing light from the light emitting diode chip DT is more increased as the distance h is more increased, and hence the illuminance of the reflected light is increased, Note that if a middle gap or middle gaps is/are present as one distance or a plurality of distances at which the distance h is larger than the low gap GL and smaller than the high gap GH, the non-jetting flushing may be executed when the printing mode is the high gap printing mode and when the printing mode is the middle gap printing mode.

Next, an explanation will be made about the operation of the jetting head 10 and the operation of the light emitting diode chips DT in this embodiment. In this embodiment, the jetting head 10 performs the unidirectional printing, and the light emitting diode chips DT irradiate the ultraviolet ray during the movement in the both directions in the main scanning direction Ds. An explanation will be made in detail below.

The carriage 3 is moved rightwardly in the main scanning direction Ds (FIG. 1) during one pass in the printing process. Accordingly, the jetting head 10 and the ultraviolet irradiation device 40 are moved rightwardly during the printing process. In this case, the jetting head 10 does not jet the ink onto the printing medium W while the jetting head 10 is moved rightwardly in the main scanning direction Ds, and the light emitting diode chips DT irradiate the printing medium W with the ultraviolet ray while the light emitting diode chips DT are moved rightwardly in the main scanning direction Ds. In this situation, the controller 19 executes the non-jetting flushing with respect to all of the nozzles 121. Note that the reason, why the irradiation with the ultraviolet ray is performed by the light emitting diode chips DT in the state in which the ink is not jetted as described above, resides in such a viewpoint that the added-up light amount of the ultraviolet ray is raised to sufficiently cure the ink.

If one pass of the printing process is terminated as described above, the carriage 3 is moved leftwardly in the main scanning direction Ds in relation to the second pass. Accordingly, the jetting head 10 and the ultraviolet irradiation device 40 are moved leftwardly in the main scanning direction Ds. In this case, the jetting head 10 jets the ink onto the printing medium W while the jetting head 10 is moved leftwardly in the main scanning direction Ds, and the light emitting diode chips DT irradiate the jetted ink with the ultraviolet ray while the light emitting diode chips DT are moved leftwardly in the main scanning direction Ds. In this situation, the controller 19 executes the non-jetting flushing as the agitating process for only the nozzles 121 which do not jet the ink.

As described above, when the light emitting diode chips DT irradiate the ultraviolet ray, all of the nozzles 121 undergo any one of the ink jetting and the non-jetting flushing. According to the fact as described above, the ink contained in the nozzles 121 is agitated, and the curing of the ink, which would be otherwise caused by the ultraviolet ray, is not caused.

Figure 9:
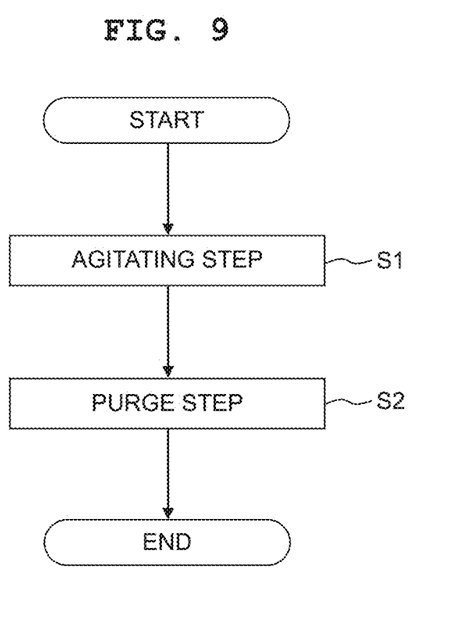
FIG. 9 is a flow chart schematically illustrative of an image recording method of an embodiment of the present teaching.

In the next place, an explanation will be made by using a flow chart about an image recording method according to this embodiment. Note that the flow chart will be briefly explained on account of the duplication with the contents described above. With reference to FIG. 9, the non-jetting flushing is executed as the agitating process (Step SI) if the distance h between the platen 6 and the jetting surface NM of the nozzle 121 is larger than the previously stored threshold value and if the printing is performed in the high gap printing mode. Note that the non jetting flushing is performed as described above for every pass. Then, after the agitating process, the purge process is executed by the purge unit 50 (Step S2).

As described above, according to the image recording apparatus I of this embodiment, the agitating process, in which the ultraviolet-curable type ink contained in the jetting head 10 is agitated without jetting the ink, is executed at least during the irradiation with the ultraviolet ray effected by the light emitting diode chips DT. Accordingly, even when the ultraviolet-curable type ink contained in the nozzles 121 is irradiated with the scattered light coming from the light emitting diode chips DT and the reflected light coming from the printing medium W, the agitating process described above makes it possible to suppress the ink contained in the nozzles 121 from being cured during the irradiation or after the irradiation with the ultraviolet ray.

Further, in this embodiment, the ink can be forcibly discharged from the nozzles 121 by executing the purge process after executing the non-jetting flushing as the agitating process. Accordingly, the ink can be discharged before the advance of the polymerization of the ink contained in the nozzles 121.

Further, in this embodiment, the non-jetting flushing is executed as the agitating process if the distance his larger than the previously stored threshold value (for example, 10 mm) during the irradiation with the ultraviolet ray. Accordingly, it is possible to avoid such a situation that the non-jetting flushing is unnecessarily executed even when the spread of the outgoing light coming from the light emitting diode chips DT is not increased so much due to the small distance h.

Further, in this embodiment, the non-jetting flushing, is executed as the agitating process if the printing mode is the high gap printing mode. Accordingly, it is possible to avoid such a situation that the non-jetting flushing is unnecessarily executed even when the spread of the outgoing light coming from the light emitting diode chips DT is not increased so much due to the small distance h in the low gap printing mode.

Further, in this embodiment, the non-jetting flushing is executed as the agitating process for the nozzles 121 which do not jet the ink when the light emitting diode chips DT irradiate the ultraviolet ray. Owing to this fact, even in the case of the nozzles 121 which do not jet the ink, the ink contained in the nozzles 121 is agitated, and the curing of the ink is not caused by the ultraviolet ray.

Modified Embodiments

The present teaching is not limited to the embodiment described above. It is possible to make various modifications within a range without deviating from the gist or essential characteristics of the present teaching. For example, the Ibllowing modifications are available.

In the embodiment described above, the piezoelectric element is adopted as the actuator 160. However, there is no limitation thereto. It is also allowable to adopt any other actuator such as a thermal actuator or the like.

Further, the embodiment described above is configured such that the printing medium W is relatively moved in the subsidiary scanning direction Df with respect to the jetting head 10 by conveying the printing median W in the subsidiary scanning direction Df by means of the platen 6. However, there is no limitation thereto. Such configuration may be made that the printing medium W is relatively moved in the subsidiary scanning direction Df with respect to the jetting head 10 by moving the jetting head 10 in the subsidiary scanning direction Df with respect to the printing medium W.

Further, in the embodiment described above, the high gap GH is 18 mm, and the low gap GL is 2 mm. However, the high gap GH and the low gap GL are not limited to the values described above. It is appropriate that the low gap GL is smaller than the high gap GH. For example, the high gap GH is not less than 7 mm, and the difference between the high gap GH and the low gap GL is not less than 5 mm.

Further, in the embodiment described above, two jetting heads 10 (10A, 10B) and two ultraviolet irradiation devices 40 (40A, 40B) are carried on the carriage 3. However, there is no limitation thereto. It is also allowable that only one jetting head 10 and only one ultraviolet irradiation device 40 may be carried.

What is claimed is:

1. An image printing apparatus comprising:
   a jetting head being movable in a main scanning direction and including nozzles configured to jet an ultraviolet-curable type ink onto a printing medium;
   a light source configured to irradiate the ultraviolet-curable type ink jetted onto the printing medium with an ultraviolet ray;
   a movement mechanism configured to relatively move the printing medium with respect to the jetting head in a subsidiary scanning direction orthogonal to the main scanning direction; and
   a controller configured to accept a printing job including information to instruct:
      a low gap printing mode in which printing is performed with a low gap in a direction orthogonal to both the main scanning direction and the subsidiary scanning direction or
      a high gap printing mode in which the printing is performed with a high gap, which is larger than the low gap, in the direction orthogonal to both the main scanning direction and the subsidiary scanning direction,
   wherein in a case of accepting the printing job including the information to instruct the high gap printing mode, the controller is configured to cause the ink contained in the jetting head to be agitated without jetting the ink at least during irradiation with the ultraviolet ray by the light source.

2. The image printing apparatus according to claim 1, wherein the controller is configured to forcibly discharge the ink from the nozzles, after causing the ink contained in the jetting head to be agitated without jetting the ink.

3. The image printing apparatus according to claim 1, wherein the movement mechanism includes a platen on which the printing medium is to be placed.

4. The image printing apparatus according to claim 1, wherein during the irradiation with the ultraviolet ray, the controller is configured to cause the ink contained in the nozzles, which do not jet the ink, to be agitated without jetting the ink.

5. An image printing method using an image printing apparatus including a jetting head being movable in a main scanning direction and including nozzles configured to jet an ultraviolet-curable type ink onto a printing medium, a light source configured to irradiate the ultraviolet-curable type ink jetted onto the printing medium with an ultraviolet ray, and a movement mechanism configured to relatively move the printing medium with respect to the jetting head in a subsidiary scanning direction orthogonal to the main scanning direction, the image printing method comprising:
   accepting a printing job including information to instruct:
      a low gap printing mode in which printing is performed with a low gap in a direction orthogonal to both the main scanning direction and the subsidiary scanning direction or
      a high gap printing mode in which the printing is performed with a high gap, which is larger than the low gap, in the direction orthogonal to both the main scanning direction and the subsidiary scanning direction; and
   causing the ink contained in the jetting head to be agitated without jetting the ink at least during irradiation with the ultraviolet ray by the light source, in a case of accepting the printing job including the information to instruct the high gap printing mode.

6. The image printing method according to claim 5, further comprising forcibly discharging the ink from the nozzles, after causing the ink contained in the jetting head to be agitated without jetting the ink.

7. The image printing method according to claim 5, wherein, the movement mechanism includes a platen on which the printing medium is to be placed.

8. The image printing method according to claim 5, wherein during the irradiation with the ultraviolet ray, the ink contained in the nozzles, which do not jet the ink, is agitated without jetting the ink.

9. A non-transitory medium storing an image printing program executable by an image printing apparatus including: a jetting head being movable in a main scanning direction and including nozzles configured to jet an ultraviolet-curable type ink onto a printing medium; a light source configured to irradiate the ultraviolet-curable type ink jetted onto the printing medium with an ultraviolet ray; a movement mechanism configured to relatively move the printing medium with respect to the jetting head in a subsidiary scanning direction orthogonal to the main scanning direction; and a controller, the program causing the controller to:

accept a printing job including information to instruct:

a low gap printing mode in which printing is performed with a low gap in a direction orthogonal to both the main scanning direction and the subsidiary scanning direction or         a high gap printing mode in which the printing is performed with a high gap, which is larger than the low gap, in the direction orthogonal to both the main scanning direction and the subsidiary scanning direction; and     execute an agitating process for agitating the ink contained in the jetting head without jetting the ink at least during irradiation with the ultraviolet ray by the light source, in a case of accepting the printing job including the information to instruct the high gap printing mode.

10. The medium according to claim 9, wherein the program causes the controller to execute a purge process for forcibly discharging the ink from the nozzles after the agitating process.

11. The medium according to claim 9, wherein the movement mechanism includes a platen on which the printing medium is to be placed.

12. The medium according to claim 9, wherein during the irradiation with the ultraviolet ray, the program causes the controller to execute the agitating process for the nozzles which do not jet the ink.

* * * * *